US007139812B2

(12) United States Patent  (10) Patent No.: US 7,139,812 B2
Dozier et al.  (45) Date of Patent: *Nov. 21, 2006

(54) METHOD AND APPARATUS FOR PUBLISHING HYPERMEDIA DOCUMENTS OVER WIDE AREA NETWORKS

(75) Inventors: Linda T. Dozier, Goleta, CA (US); George W. Williams (V), Santa Barbara, CA (US); Dave Long, Santa Barbara, CA (US); Douglas M. McKee, Santa Barbara, CA (US); James G. Davidson, Santa Barbara, CA (US); Karen Brady, Woodside, CA (US)

(73) Assignee: America Online, Inc., Dulles, VA (US)

( * ) Notice: Subject to any disclaimer, the term of this patent is extended or adjusted under 35 U.S.C. 154(b) by 383 days.

This patent is subject to a terminal disclaimer.

(21) Appl. No.: 10/097,418

(22) Filed: Mar. 15, 2002

(65) Prior Publication Data

US 2003/0041117 A1  Feb. 27, 2003

Related U.S. Application Data

(63) Continuation of application No. 09/204,745, filed on Dec. 2, 1998, now Pat. No. 6,393,469, which is a continuation of application No. 08/412,981, filed on Mar. 28, 1995, now Pat. No. 5,870,552.

(51) Int. Cl.
*G06F 15/16* (2006.01)
*G06F 17/21* (2006.01)

(52) U.S. Cl. .............. 709/218; 709/219; 715/501.1

(58) Field of Classification Search ............ 709/219, 709/218; 715/501.1, 505; 345/733, 737, 345/738, 748, 749, 760
See application file for complete search history.

(56) References Cited

U.S. PATENT DOCUMENTS 4,817,050 A   3/1989  Komatsu et al.

| 5,091,849 A | | 2/1992 | Davis et al. |
| 5,220,657 A | * | 6/1993 | Bly et al. ................. 711/152 |
| 5,241,671 A | | 8/1993 | Reed et al. |
| 5,267,351 A | | 11/1993 | Reber et al. |
| 5,278,980 A | * | 1/1994 | Pedersen et al. ............ 707/4 |
| 5,297,249 A | * | 3/1994 | Bernstein et al. .......... 345/854 |
| 5,297,279 A | * | 3/1994 | Bannon et al. ......... 707/103 R |
| 5,307,456 A | | 4/1994 | MacKay |
| 5,335,320 A | * | 8/1994 | Iwata et al. ................. 717/110 |

(Continued)

FOREIGN PATENT DOCUMENTS

JP     63-286942     11/1988

(Continued)

OTHER PUBLICATIONS

Jing Xiang He et al., "A tool for hypertext-based systems analysis and dynamic evaluation", IEEE Conference on System Sciences, vol. 3, pp. 5-14, Jan. 1994.*

(Continued)

*Primary Examiner*—Patrice Winder
(74) *Attorney, Agent, or Firm*—Fish & Richardson P.C.

(57) ABSTRACT

The present invention addresses the critical needs of publishers seeking to create and publish hypermedia content in electronic form across the wide area networks ("WAN's") such as the World Wide Web. Toward this end, a client-server development platform is provided for handling the important functions of document authoring, content-based indexing and retrieval of documents, management and control of proprietary assets, and a support for developing form-driven interactive services, all in a manner that is uniquely and seamlessly WAN-integrated.

40 Claims, 11 Drawing Sheets

U.S. PATENT DOCUMENTS

| | | | | |
|---|---|---|---|---|
| 5,355,472 | A | * | 10/1994 | Lewis .................... 715/531 |
| 5,500,929 | A | | 3/1996 | Dickinson |
| 5,530,852 | A | * | 6/1996 | Meske et al. ............ 709/206 |
| 5,537,546 | A | | 7/1996 | Sauter |
| 5,551,030 | A | * | 8/1996 | Linden et al. ........... 707/102 |
| 5,557,730 | A | | 9/1996 | Frid-Nielsen |
| 5,572,727 | A | * | 11/1996 | Larsson et al. .......... 707/200 |
| 5,634,064 | A | * | 5/1997 | Warnock et al. ......... 715/513 |
| 5,649,190 | A | * | 7/1997 | Sharif-Askary et al. .... 707/101 |
| 5,708,825 | A | | 1/1998 | Sotomayor |
| 5,724,595 | A | | 3/1998 | Gentner |
| 5,727,156 | A | | 3/1998 | Herr-Hoyman et al. |
| 5,732,219 | A | * | 3/1998 | Blumer et al. ........... 709/227 |
| 5,771,355 | A | | 6/1998 | Kuzma |
| 5,778,398 | A | | 7/1998 | Nagashima et al. |
| 5,809,317 | A | * | 9/1998 | Kogan et al. ............ 715/501.1 |
| 5,838,918 | A | * | 11/1998 | Prager et al. ............ 709/221 |
| 5,870,552 | A | * | 2/1999 | Dozier et al. ............ 709/219 |
| 6,393,469 | B1 | * | 5/2002 | Dozier et al. ............ 709/219 |
| 2003/0041117 | A1 | * | 2/2003 | Dozier et al. ............ 709/217 |

FOREIGN PATENT DOCUMENTS

| | | |
|---|---|---|
| JP | 01-295340 | 11/1989 |
| JP | 04-268932 | 9/1992 |
| JP | 04-318638 | 11/1992 |
| JP | 04-348421 | 12/1992 |
| JP | 05-128110 | 5/1993 |
| JP | 06-068091 | 3/1994 |
| JP | 06-085873 | 3/1994 |
| JP | 06-095952 | 4/1994 |
| JP | 6-314230 | 11/1994 |
| JP | 07-006076 | 1/1995 |

OTHER PUBLICATIONS

Theng, Y.L. et al., "Designer tools for hypertext authoring", IEEE Colloquium on Authoring and Application of Hypermedia-Based Use-Interfaces, pp. 4/1-4/4, Nov. 1995.*

Slein, J. et al., "Requirements for a distributed authoring and versioning protocol for the world wide web", RFC2291, pp. 1-21, Feb. 1998.*

Cesare Maioli et al., Anchors and Paths in a Hypertext Publishing System, Feb. 1993, Technical Report UBLCS-93-3, Laboratory for Computer Science University of Bologna, 13 pages, [retrieved from http://citeseer.csail.mit.edu/ on Mar. 10, 2006].*

Cesare Maioli et al., Versioning issues in a Collaborative Distributed Hypertext System, Apr. 1993, Technical Report UBLCS-93-6, Laboratory for Computer Science University of Bologna, 16 pages, [retrieved from http://citeseer.csail.mit.edu/ on Mar. 10, 2006].*

Cesare Maioli et al., Wide-Area Distribution Issue in Hypertext Systems, Oct. 1993, Technical Report UBLCS-93-24, Laboratory for Computer Science, University of Bologna, 15 pages, [retrieved from http://citeseer.csail.mit.edu/ on Mar. 17, 2006].*

Nick Willaims et al., Experiences in Writing a WYSIWYG Editor for HTML, Proceedings of WWW '94, Switzerland, 1994, 12 pages, [retrieved from http://citeseer.csail.mit.edu/ on Mar. 17, 2006].*

Claris, "MacProjectII Users' Guide," Claris Corporation, Mountain View, CA, 1986, Chapters 1-4, pp. 1-138.

Hughes, Kevin, "Entering the World-Wide Web: A Guide to Cyberspace," May 1994.

Berners-Lee, Tim, et al., "The World-Wide Web," Communications of the ACM, Aug. 1994.

Baker, Steven, "Hypertext Browsing on the Internet," UNIX Review, Sep. 1994.

Gunn, Angela, "Power in Pictures: Easier That It Looks," Computer Shopper, Nov. 1994.

McArthur, Douglas C., "World Wide Web and HTML," Dr. Dobb's Journal of Software Tools, Dec. 1994.

Lewis, Peter H., "Business Technology: Prodigy Leads Its Peers Onto the World Wide Web," The New York Times, Jan. 18, 1995, Sec. D, p. 7, col. L1, "Business/Financial Desk".

Flynn, Laurie, "The Executive Computer: Browsers Make Navigating the World Wide Web a Snap," The New York Times, Jan. 29, 1995, Sec. 3, p. 6, col. 1, "Business/Financial Desk".

Boutell, Thomas, "World Wide Web Frequently Asked Questions," World Wide Web FAQ, Jan. 23, 1995, resides on the World Wide Web on Sunsite.

"Cover Story: Electronic Publishing," PC Magazine, Feb. 7, 1995, pp. 110-196.

Cortese, Amy, et al., "Cyberspace," Business Week, Feb. 27, 1995, pp. 78-86.

Marriott, Michel, et al., "Super Cyber Surfers," Newsweek, Mar. 20, 1995, pp. 43-44.

Veljkov et al.; Pocket Guides to the Internet: vol. 2: Transferring Files with File Transfer Protocol; ISBN 0-88736-944-8; Meckler Corp., Westport CT USA; pp. 11-17, 1994.

"San Francisco Reservations," Internet Magazine, No. 2, Japan, Dec. 18, 1994, pp. 126-127.

"Publishing on the Web", B. Rousseau, 1995 Cern School of Computing, Proceedings (Cern 95-05), 1995 Cern School of Computing, Proceedings, Arles, France, Aug. 20-Sep. 2, 1995, 1995 Geneva, Switzerland, Cern, Switzerland, pp. 279-293, XP000578592.

Vatton, I., "Amaya—W3C's Browser/Editor", retrieved from Internet at http://www.w3.org/Amaya/, Jul. 10, 1998.

Vatton, I., "Amaya 1.3", retrieved from Internet at http://www.w3.org/Amaya/User/New.html, Jul. 10, 1998.

Office Action issued Feb. 7, 2006 for Application No. 2004-170836. Information Processing Society, 49th, International Conference, Sep. 30, 1994, pp. 1-13 and 1-14.

HTML Quick Reference, INTERNET magazine No. 3, Impress Co., Feb. 18, 1995, No. 3, pp. 9-11.

\* cited by examiner

FIG. 3
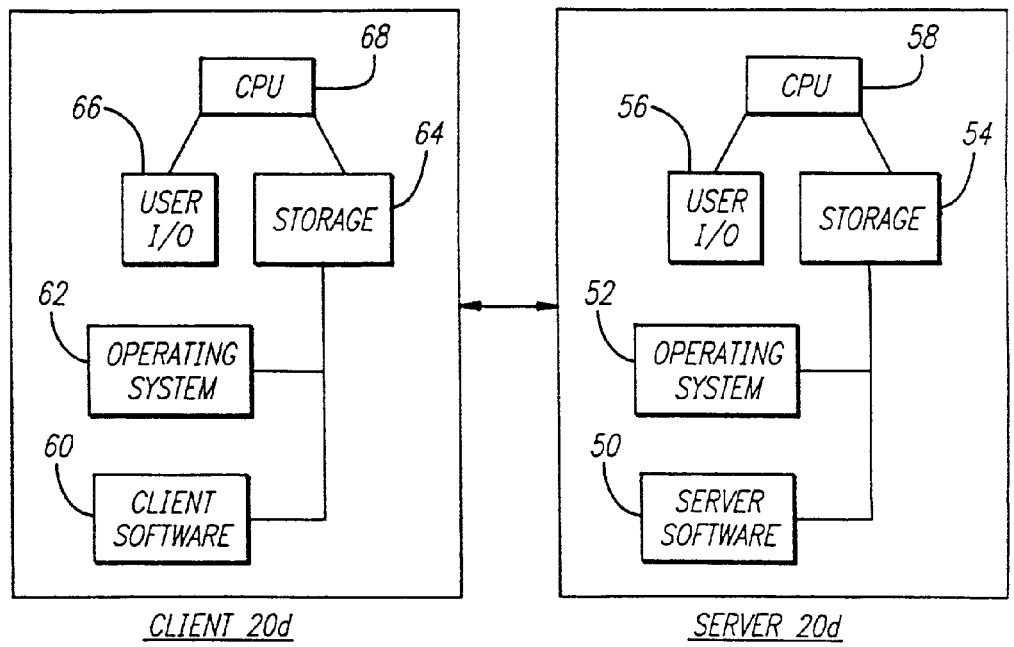
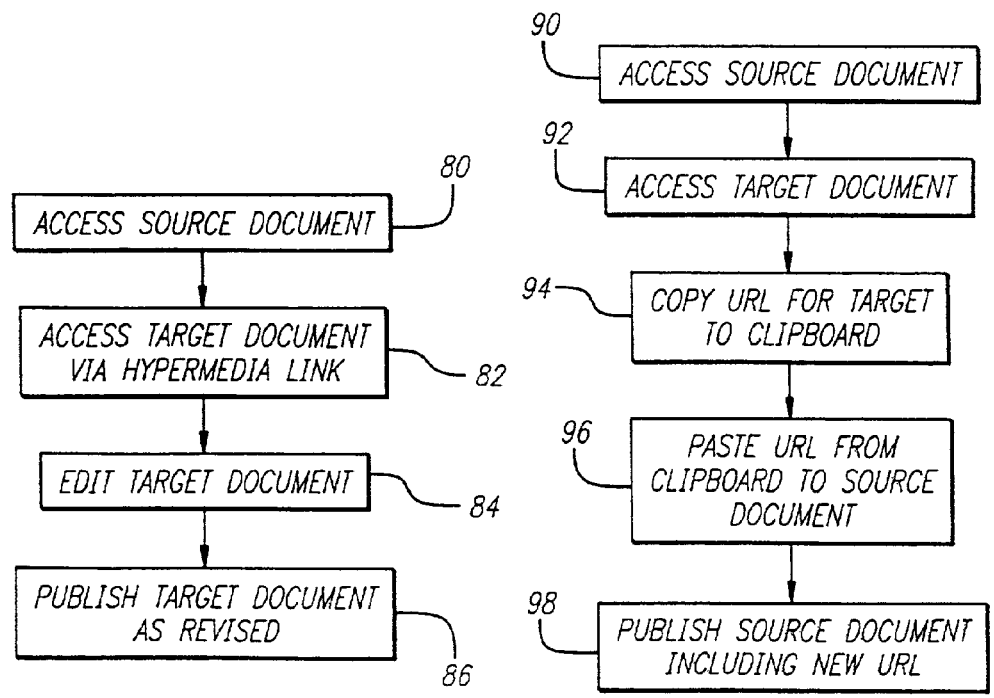
FIG. 5a
FIG. 5b

FIG. 10a

When finished, press the Create Table button to create the new table. — 164

Table Name: comments
Table Description: Customer Feedback Form
Table is Searchable: ■

Column 1:
Name: cust_name    Type: text
Description: Customer Name
not null: ☐   unique: ☐   index: ☐     } 162a Column 2:
Name: e-mail    Type: text
Description: Electronic Mail Address
not null: ☐   unique: ☐   index: ☐     } 162b Column 3:
Name: address    Type: text     } 162c

METHOD AND APPARATUS FOR PUBLISHING HYPERMEDIA DOCUMENTS OVER WIDE AREA NETWORKS

This application is a continuation of U.S. patent application Ser. No. 09/204,745, filed Dec. 2, 1998, U.S. Pat. No. 6,393,469 which is a continuation of U.S. patent application Ser. No. 08/412,981, filed Mar. 28, 1995, now U.S. Pat. No. 5,870,552, both of which are incorporated by reference.

FIELD OF THE INVENTION

The present invention relates to the field of authoring, publishing, and managing electronic hypermedia documents across distributed, wide area networks such as the World Wide Web.

BACKGROUND OF THE INVENTION

The distribution of information is being revolutionized before our very eyes. Wide area networks ("WAN's"), notably the Internet, are assuming the role of "information superhighways" and are distributing electronic embodiments of mail, textbooks, magazines, advertisements, and even audio and video clips around the world. Herein, the term "document" denotes and includes any and all such electronic content, generically.

FIG. 1 conceptually illustrates the basic architecture of a "client-server" WAN like the Internet. Servers 10a–n form the backbone of the WAN. The servers are interconnected by a telecommunications infrastructure and exchange information in the form of one or more recognized protocols, such as protocol 30. For example, in the case of the Internet, network protocols include FTP, for file transfer, and Telnet, for remote log-in. Each server effectively represents and services its one or more "clients." Basically, the clients are the ultimate sources and targets of underlying information, while the servers dispatch and receive messages across the WAN in compliance with network protocols. Each client may correspond to a single user's computer, or may itself be hierarchically complex and may comprise a further sub-network or collection of numerous computers, such as the well-known, proprietary sub-networks of America Online, CompUServe, and Prodigy. In this way, information of any kind can be distributed worldwide in electronic form at telecommunications speeds.

One of the most rapidly expanding aspects of the Internet is the World Wide Web (the "Web"). The Web is comprised of those Internet servers (and their clients) able to support the Hyper-Text Transfer Protocol, better known as "http." The Web allows documents and graphical materials to be interlinked by means of "hypertext" (or more generally, hypermedia) document elements. When a user utilizes a cursor control device to select and "click" on a hypermedia item in one document, a related document will automatically be accessed as identified by that link. For example, FIG. 2 illustrates a simple example of a popular Web document known as a "home page." Home page 40 includes title 42, graphic image 44, instructional text 48, and list of bullet items 46a–c. Selections 46a–c are each hypertext. A Web hypermedia item is actually encoded with a Uniform Resource Locator ("URL") tag, which literally addresses a document located on a remote network server. If a client of a Web server is equipped with suitable "browser" software, then a user of that client can point and click on any one of the hypermedia items within home page 40, and an http request to view the associated, linked content residing elsewhere on the Internet will automatically be generated and dispatched by the client's server to the appropriate Internet server which "hosts" the linked document. The linked material will then automatically be retrieved and ultimately displayed on the client. Http further includes the Hyper-Text Markup Language ("html"), which may be used to specify a certain layout structure for Web documents, e.g., specifying subsections of the document as a title, image, list, etc. Html specifications are interpreted by a client's browser, resulting in an appropriate display on the particular client's computer platform. A survey and discussion of many popular Web browsers is provided in the Feb. 7, 1995, issue of *PC Magazine* ("*PC Magazine*"), at pages 173–196.

An important challenge that must be addressed, especially in light of the burgeoning expansion and popularity of the Internet and the Web, is how best to facilitate the authoring and publishing of hypermedia documents on the Web. Many large and small publishers of content—such as newspaper and magazine publishers, for example—wish to make their content available in on-line form to subscribers. However, this opportunity presents a major bottleneck, because high-quality development platforms and authoring tools have not yet been developed that adequately facilitate the authoring and publishing of hypermedia on a distributed WAN like the Web. A summary of the primary limitations of current Internet and Web publishing tools follows:

1. Current publishing tools are typically not fully network-integrated. Browsers or other "cruiseware" help users view existing WAN content, but do not generally support authoring of new WAN content. Current authoring tools, on the other hand, are typically either "stand-alone" local products, or at best offer a limited bridge to WAN access such that authoring and WAN navigation remain fundamentally non-integrated processes.

For example, in order to publish a document on a WAN, it is typically necessary to edit documents in a local storage context using authoring tools, and thereafter manually copy the documents to a WAN server. Manual copying is often tedious and inconvenient, especially where a publisher frequently publishes a large quantity of content from diverse sources, including text files, graphics images, video and sound clips, etc. Yet, current authoring tools generally provide little assistance with this chore.

The non-integrated nature of current authoring tools presents other difficulties and limitations as well. For example, it is not generally possible to "open" multiple WAN documents for editing and to transfer text, images, and URL's among those documents in the seamless fashion as is presently done with typical word processors for local computer documents. As another example, current Web authoring tools generally do not provide full WYSIWYG ("What You See Is What You Get") feedback as to html markups and hypermedia links. In other words, the creation and editing of documents is typically performed in a purely local context; html and URL codes must then be separately tested in a serial fashion, by loading the document into a WAN browser or the like. This serial, iterative process is highly inefficient.

2. Current WAN publishing tools provide little assistance with managing collections of documents. Although the World Wide Web is famous for supporting hypermedia document links, current tools provide scant support for maintaining and operating on collections of related documents as a group. Much progress is needed in this area. For example, an integrated publishing environment should preferably allow users to visually navigate through collections of interconnected documents; to upload, download, and transport collections of documents from one WAN location to another as a group; and to set access privileges or other attributes for a WAN collection as a group. Current tools generally fall far short of these objectives.

3. Current publishing tools provide little assistance with content-based indexing and retrieval. Current navigational tools, such as browsers, provide very little assistance with systematically organizing and searching the information content contained within the numerous sites comprising a network like the Internet. Clearly, as the volume of both information and traffic on the Internet continues to explode, publishers need to be able to make their content available to subscribers in an intelligently organized fashion that facilitates uniform, content-driven search and access.

4. Current publishing tools provide little assistance with asset management. For commercial publishers of proprietary material like newspapers or periodicals, asset management is critical. In other words, publishers need to be able to control and limit access to their WAN documents, and to keep track of usage for billing and other purposes. Yet, currently available tools for WAN publishing generally ignore this area almost completely.

5. Current Publishing tools do not address the creation of application programs. For on-line network publishing to realize its full potential, publishers will want to do more than simply dump passive, one-way content onto the Internet. They will want to provide application programs allowing network users to take advantage of interactive on-line services such as subscribing to a publication, registering for a conference, or perhaps even more exotic applications like participating in multi-player games contests. Current network publishing and authoring tools largely ignore this area.

Accordingly, there is a great need for a new development platform for distributed publishing that overcomes the various limitations described above. This need is especially pronounced and important in view of the rapid expansion of interest in the Internet and the Web, and the tremendous economic opportunities presently available to publishers if a suitable development platform can be provided. Recently, authoring tools have begun to emerge, which attack some of the foregoing problems in piecemeal fashion. See *PC Magazine* at pp. 110–196. However, there remains a great need for a comprehensive solution to the problems described, and especially for an authoring/publishing tool that is truly and fully network-integrated.

SUMMARY OF THE INVENTION

We disclose herein a development platform technology for publishing hypermedia documents across wide area networks ("WAN's"). This technology supports key publishing functions including document authoring, management and publishing of document collections, and support for database operations and interactive application program development. These functions are supported in a uniquely and fully WAN-integrated manner, as described further below.

In one feature of the present invention, a WAN document residing on a WAN server may be accessed via a hypermedia link, edited, and stored to the same server or any other WAN server, using a client computer coupled to the same server or any other WAN server. The processes of accessing, editing, and storing may be performed using a seamless user interface on the client computer. By "seamless" user interface we mean that users are not required to request additional steps such as intermediate copying or storage of the document being edited, or to switch back and forth among distinct "modes" or interfaces. Thus, browsing and editing of WAN documents is truly integrated. A related feature of the invention allows convenient transfers of content and/or hypermedia links among a plurality of WAN documents, such as by "cut and paste" or "drag and drop" copying. Another related feature provides immediate execution and feedback for any display instructions added to the document using a standard WAN mark-up language.

In another feature of the present invention, at least two WAN documents residing on the same or different WAN servers are accessed, and a hypermedia link addressing one of the documents is inserted into another. Once again, the processes of accessing and editing are performed using a seamless user interface on a client computer. In a related feature of the invention, a list of suggested target hypermedia links is automatically generated using statistical language processing techniques, and the link to be inserted is interactively chosen from that list.

Another feature of the present invention provides a method for publishing and managing a collection of related documents on a WAN. The related documents to be included in the collection are specified, and a desired operation (such as setting access controls or changing location) may then be performed collectively on each document in the collection, simply by interactively issuing a single command corresponding to the operation. A related feature includes hypermedia links between documents of the collection, which address target documents relatively to source documents; i.e., each link address does not specify an absolute address for the target independently of the source. In another related feature, elements of the collection including documents and hypermedia links are graphically depicted using icons and connecting lines, thereby facilitating convenient, visual navigation and organization of the collection.

In a further feature, the present invention includes a method for providing form-driven interactive services on a WAN. A form-driven service is developed by creating a template form comprising one or more informational fields, as well as one or more hypermedia links addressing a database system or other utility program stored on an application server. The form-driven service is utilized by filling in the informational fields, and "clicking" or otherwise signalling on the hypermedia link when ready. In response, the application server is sent an appropriate WAN message, and processes the form. These steps (except the last step) are performed using a seamless user interface environment, so there is once again no need for users to switch interfaces or request any intermediate copying in order to perform the process of creating and filling in a template form and signalling when the form is ready for processing.

BRIEF DESCRIPTION OF THE DRAWINGS

FIG. 3 broadly outlines a client-server architecture in accordance with the present invention.

FIG. 5*a* illustrates a flow diagram for a scenario in which WAN hypermedia documents are created and edited in accordance with the present invention.

FIG. 5a illustrates a flow diagram for a second scenario in which WAN hypermedia documents are created and edited in accordance with the present invention.

FIG. 10a illustrates a preferred interface form for adding a customer feedback table to an indexed database, in accordance with the present invention.

FIG. 10c illustrates a modified template form for adding a particular customer's feedback to an indexed database, in accordance with the present invention.

FIG. 10d illustrates a template form for searching an indexed database for particular customer feedback, in accordance with the present invention.

DETAILED DESCRIPTION OF THE INVENTION

Introduction

Figure 1:
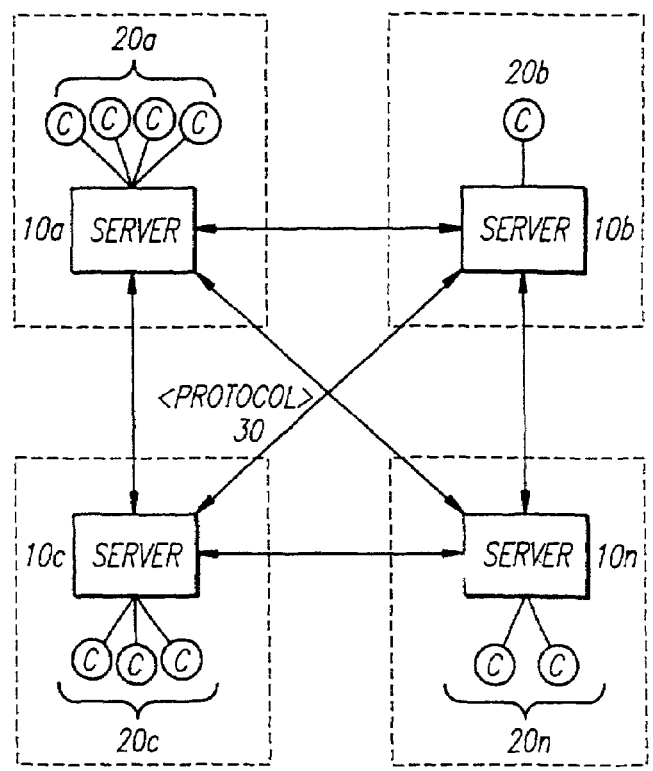
FIG. 1 illustrates a basic, high-level architecture for a typical client-server WAN such as the Internet or the World Wide Web.
Figure 2:
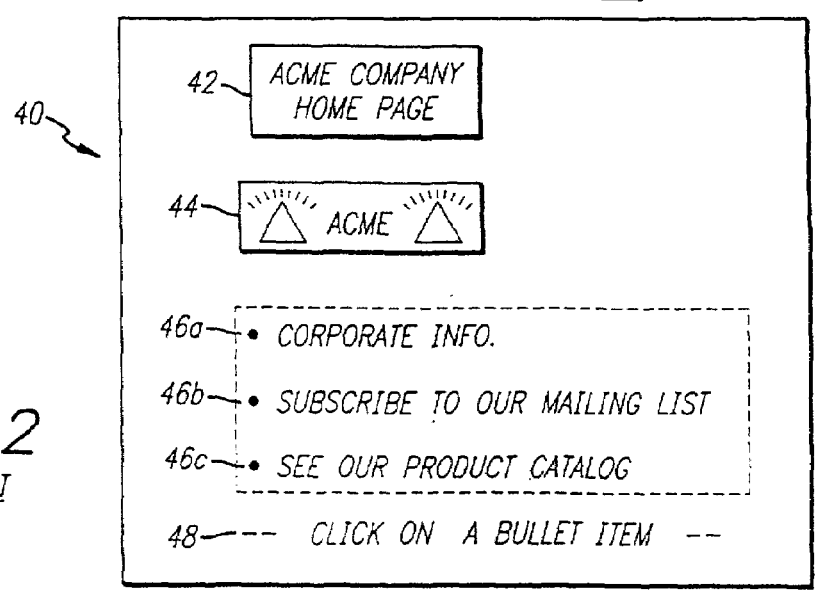
FIG. 2 illustrates a simple example of a typical "home page" document on the World Wide Web.

FIG. 3 provides a broad outline of a client-server architecture in accordance with the present invention, for use in the context of a WAN such as illustrated in FIG. 1. User's client machine 20d preferably includes digital computer facilities including CPU 68, user I/O peripherals 66, and storage device 64 (including internal and external memory) storing operating system 62 and client software 60. WAN server 10d, preferably coupled to client 20d through a high-speed local connection, is equipped with digital computer facilities analogous to those of client 20d, and also with server software 50.

As described in much greater detail below, client software 60 and server software 50 preferably share the responsibility for providing advantageous and innovative electronic publishing capabilities in accordance with the present invention. Note that a user of client computer 20d seeking the benefits of the present invention need only have client software 60 available on client computer 20d, and all or part of server software 50 available on server 10d (depending on the particular features desired). The user can then advantageously access and publish documents to and from the remainder of the WAN in accordance with the present invention, even though other computer systems on the WAN have not been similarly modified or upgraded.

The inventors are, as of this writing, in the process of developing a preferred embodiment of the present invention including client software 60 called "NaviPress" and server software 50 called "NaviServer." As a supplement to the detailed description provided below, an Appendix is provided herewith which contains illustrative source code, architectural specifications entitled "NaviPress and NaviServer: A Client-Server Publishing System for the World-Wide Web" (hereinafter "White Paper"), and excerpts from a draft User Manual for NaviPress and NaviServer. The reader is referred to the Appendix for more details regarding this preferred embodiment, and the Appendix materials are incorporated herein in their entirety by this reference.

Network-Integrated Editing

The present invention enables users to access, edit, and store documents distributed throughout a WAN, in the advantageous manner of state-of-the-art, private computer or local area network word processing tools. In accordance with the present invention, the basic process framework by which WAN documents are accessed, edited, and stored is seamless and is substantially the same as, if all steps occurred locally on a private computer. In particular, users are not required to perform any intermediary downloading or copying steps, or to switch back and forth among distinct "modes" or interfaces in order to access and browse WAN documents, to edit them, and to store them.

Figure 4:
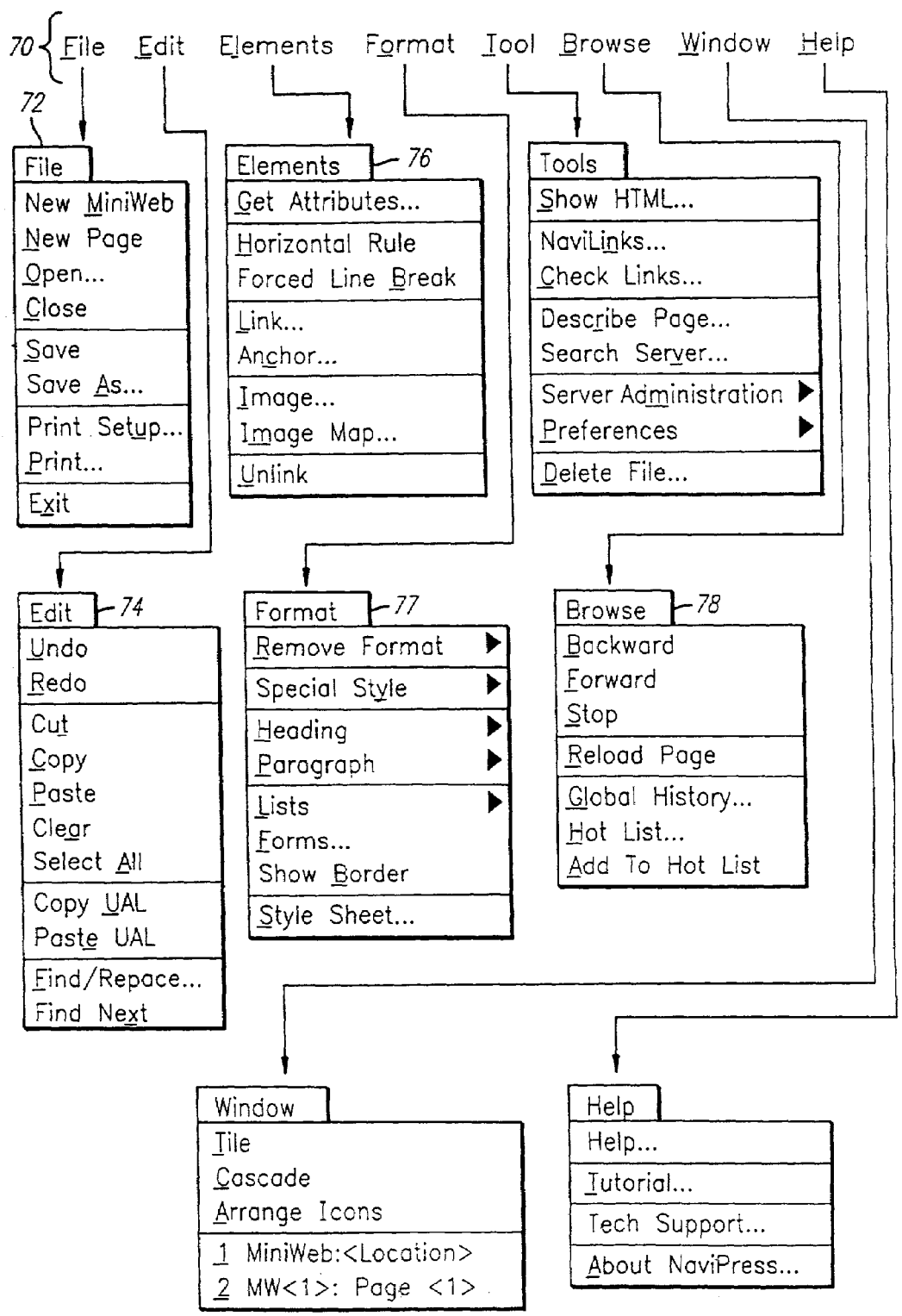
FIG. 4 illustrates a preferred document editor environment in accordance with the present invention.

As a more concrete illustration of this capability, FIG. 4 illustrates a preferred, menu-driven document editor in accordance with the present invention. Typically, menu bar 70 would be displayed continually at the top of a computer display "window" in which a particular document is being edited. "Pull-down" menus, such as "file" menu 72, are displayed when a user selects a corresponding item from command bar 70, preferably using a cursor control device. For example, file menu 72 includes commands to "open" existing documents for editing, and to "save" such documents as revised, etc. This general, menu-driven methodology is of course by now familiar to those of ordinary skill in the relevant arts. The present invention enables these capabilities to be applied seamlessly across a wide area network. In other words, a user can conveniently access, edit, and save any WAN document in much the same way as the user has been accustomed to doing with respect to documents residing locally on the user's private, personal computer. Consider a scenario in which multiple WAN hypermedia documents are being worked upon. As indicated in FIG. 4, edit menu 74 includes "cut and paste" commands allowing text and other information to be transferred conveniently between multiple WAN documents. "Cut" and "copy" commands will typically post to a "clipboard" (i.e., temporary storage) selected content from any document being edited, while the "paste" command will insert whatever content is currently held in the clipboard into a different document at a point of insertion selected by the user.

The present invention provides further advantages in the context of hypermedia WAN documents, as illustrated by the scenarios described in the flow charts of FIGS. 5a and 5b. With respect to FIG. 5a, at step 80 the user of client computer 20d invokes file menu 72 to access a source document, such as by "opening" an existing document located on any WAN server. In this example, the source document contains a hypermedia link addressing a target document, located on the same or any other WAN server. At step 82, the user accesses the target document by "clicking" on the hypermedia link using a cursor control device, which immediately opens the target document for editing in accordance with menu bar 70, preferably in a separate document window.

At step 84, the user can immediately edit and revise the accessed target document. This step preferably includes use of a markup language recognized on the WAN, such as html; elements menu 76 and format menu 77 in FIG. 4 provide convenient tools for creating and editing html content with immediate WYSIWYG feedback. The editing step also preferably includes interactively transferring or copying any selected portion of the source document to the target document (or vice versa), such as by "cutting and pasting" or by "dragging and dropping" the selected portion using a cursor control device. Moreover, the copied portion may include hypermedia links (URL's) or other mark-up codes, and any such mark-up codes will immediately be active as soon as inserted into the target document. Because the browsing and editing environment is seamless in accordance with the present invention, these editing tasks can now be performed without requiring users to switch between separate interface modes or to temporarily download documents into local storage, as was traditionally necessary.

Finally, at step 86, the target document is saved as revised to any WAN server by using the "save" or "save as" commands of file menu 72. Note that server 10*d*, the source server, target server, and the ultimate destination server of the target document may all be the same server, or may all be different.

In the scenario described in FIG. 5*b*, at steps 90 and 92 the user of client computer 20*d* accesses a source document and a target document, such as by invoking file menu 72. The source and target may originally be located on any wan servers. At step 94, the "copy URL" command of edit menu 74 is used to post a hypermedia pointer addressing the target document onto a clipboard for temporary storage. (Recall that "URL" is the term for a hypermedia link on the World Wide Web, as discussed earlier in the Background section.) At step 96, the "paste URL" command of edit menu 74 is used to paste the stored hypermedia link onto a selected "anchor" item of content within the source document. At step 98, this new document, including the new hypermedia link, may be "published" by storing it to any WAN server, simply by using the "save" commands of file menu 72. Thus, in accordance with the present invention, publishing hypermedia content across a WAN is achieved in a highly advantageous manner that fully and seamlessly integrates hypermedia browsing and editing.

As briefly noted above, the WAN-integrated editing environment is enhanced by elements menu 76 and format menu 77 which provide WYSIWYG feedback for html markup authoring without any need for users to separately launch a browser program or upload the document being edited. Other, preferred features of the editing environment depicted in FIG. 4 include WAN browser menu 78, display options and preferences, and access to help. Menu bar 70 further provides access to various WAN tools and services discussed further below, including "NaviLinks" link generation; form-driven database update and search, and asset administration services.

In summary, prior art technology has traditionally separated between WAN "browsing" on one hand, in which WAN documents are accessed and mark-up codes are interpreted and executed, and document editing on the other hand, in which documents are modified. Conventionally, users must manually switch between distinct browsing and editing environments or "modes," and/or perform intermediate steps in which WAN documents of interest are downloaded to the user's private local storage, thereafter edited, and thereafter uploaded back to the WAN. The present invention now enables users to access WAN documents, copy content (including hypermedia links and other mark-up codes) among multiple WAN documents, and execute WAN mark-up codes, all in a seamless fashion without requiring intermediate steps. Moreover, these capabilities require only the user's computer system to include software implementing the browsing and editing environment, and do not require any modification of other WAN computers.

For more details on an exemplary embodiment of the WAN document editing and browsing environment, the user is referred to the Appendix, and especially to the draft User Manual at Chapters 2, 3, and Appendix A. Exemplary source code for use in implementing this unique environment is also included in the Appendix.

Working With Collections of WAN Documents

Another aspect of the present invention is the ability to publish, maintain, and otherwise operate on collections of multiple, related documents as a group. This is an especially valuable capability in the context of hypermedia collections, where there are explicit links between specific, related portions of documents.

Figure 6:
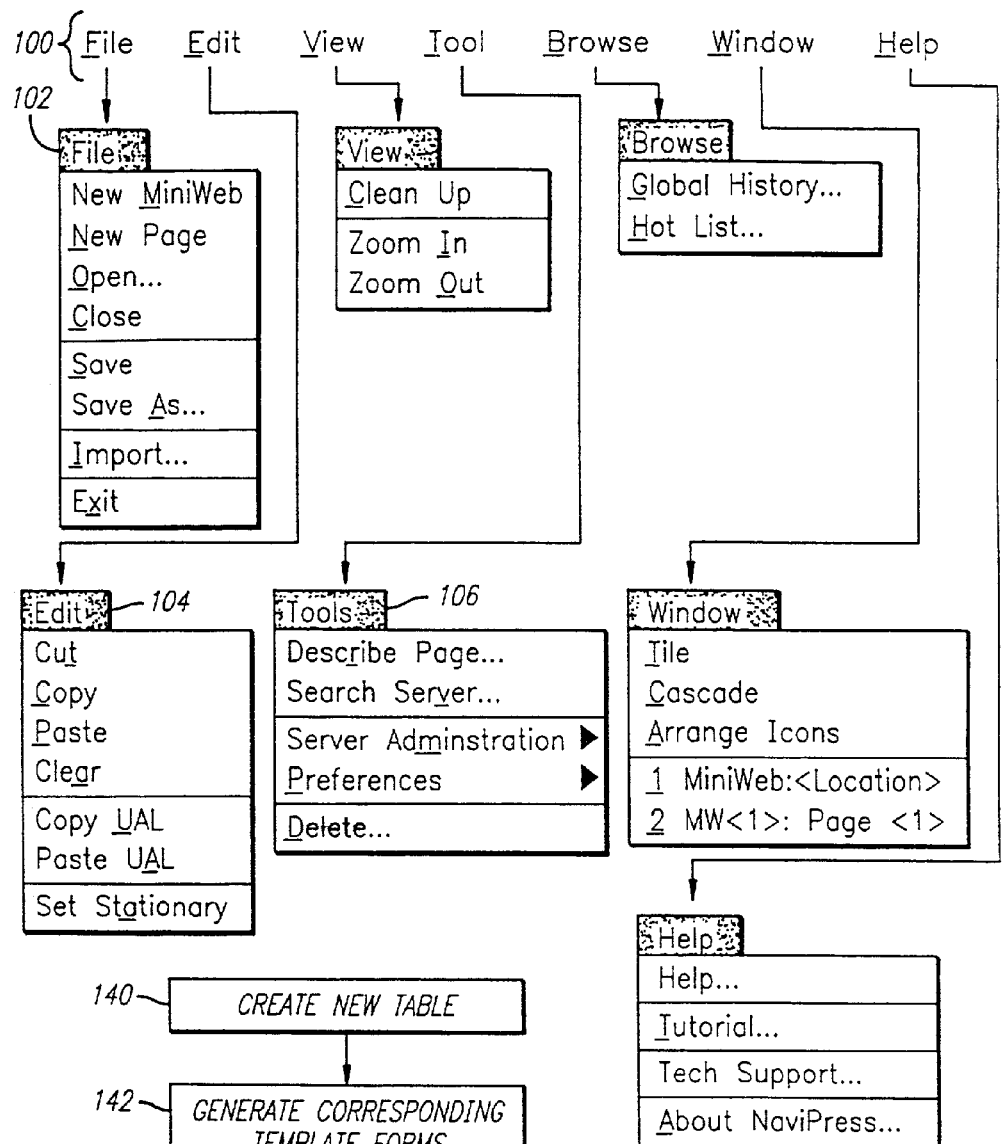
FIG. 6 illustrates a preferred set of interactive commands for working with a collection of interrelated hypermedia documents.

FIG. 6 illustrates a preferred, menu-driven authoring environment called "the MiniWeb" for working with collections of related documents in accordance with the present invention. Typically, menu bar 100 is displayed continually at the top of a computer display "window" in which a particular collection is being operated on. Many of the basic operations provided by the pull-down menus available through menu bar 100 are performed collectively upon the current document collection (or "miniweb"); in other words, a single command will be applied to all members of the collection, as a group. For example, pull-down "file" menu 102 includes commands to "save" a miniweb to any specified location in the WAN. When invoked, the command automatically stores all documents and objects in the collection to the desired new (or old) storage site. Preferably, edit menu 104 includes commands to globally search and replace a common portion of content, such as an updated company logo or URL, shared by many or all documents in the collection, although this particular command option is not explicitly shown in FIG. 6. Similarly, tools menu 106 performs administrative tasks, such as setting access controls (i.e., costs and security privileges), for collections as a group.

A related aspect of this invention involves the ability to transport collections of documents interrelated by hypermedia links in a convenient manner. Those of skill in the art recognize that when the target reference of a hypermedia link is moved, the link is thereby "broken," much like the address on a letter to a recipient who has moved and left no forwarding address. Thus, moving a collection of documents interrelated by numerous hypermedia links has been extremely onerous using prior art technology, since the hypermedia links must manually be "fixed" to address new locations.

In accordance with the present invention, one or more relative hypermedia links are preferably created among the documents of a collection. A "relative" link only addresses its target document relative to the source document's address. In other words, only a portion of the full target address is given, namely, a portion sufficient to locate the target relative to the source. Preferably, a specification of a hierarchical directory structure for each collection is maintained in a separate file along with the collection, so that only the topmost page in the collection need be tied to an absolute address, while other hypermedia links within the collection can be made relative and still be interpreted properly. Sample listings for such a specification are included on the following pages. Because the links are relative, they do not need to be modified when the collection is moved.

navidoc 1.0
graph=1
nametype=0
title=
style=
template=
Pages:
"top.htm" Up="" Style="" Title="The NaviServer Documentation" 1 94 467
"install.htm" Up="" Style="" Title="Installing the NaviServer" 1
"startup.htm" Up="" Style="" Title="Starting up the NaviServer" 1
"security.htm" Up="" Style="" Title="Security on the NaviServer" 1
"costs.htm" Up="" Style="" Title="Charging money for access " 1
"search.htm" Up="" Style="" Title="Searching the NaviServer" 1
"srchdata.htm" Up="" Style="" Title="Searching Database Tables" 1
"srchpage.htm" Up="" Style="" Title="Searching for Pages" 1
"hitlist.htm" Up="" Style="" Title="Hitlists and Hittabies" 1
"hilite.htm" Up="" Style="" Title="Hiliting and MoreLikeThis" 1
"under.htm" Up="" Styles="" Title="Coming Soon!" 1
"entup.htm" Up="" Style="" Title=Entering Data and Updating It" 1
"smartlnk.htm=" Up="" Style="" Title="SmartLinking" 1
"describe.htm" Up="" Style="" Title="Describing Pages" 1
"custom.htm" Up="" Style="" Title="Customizing Entry, Update and Search Forms" 1
"archive.htm" Up="" Style="" Title="Archive Versioning" 1
"logging.htm" Up="" Style="" Title="Logging" 1
"ops.htm" Up="" Style="" Title="NaviServer URL Reference" 1
"maktable.htm" Up="" Style="" Title="Creating.and Dropping Tables" 1
"tables.htm" Up="" Style="" Title="NaviServer System Tables" 1
"page21.htm" Up="" Style="" Title="Please title this page. (Page 21 in servdocs)" 1
"sumobanr.gif" Up="" Style="" Title="" 1
"sumoguy1.gif" Up="" Style="" Title="" 1
"sumoguy2.gif" Up="" Style="" Title="" 1
"sumoguy3.gif" Up="" Style="" Title="" 1
"sumoguy4.gif" Up="" Style="" Title="" 1
"sumoguy5.gif" Up="" Style="" Title="" 1
"sumoguy6.gif" Up="" Style="" Title="" 1
"sumochar.gif" Up="" Style="" Title="" 1
"sumoleaf.gif" Up="" Style="" Title="" 1
"sumoguy7.gif" Up="" Style="" Title="" 1
"sumoguy8.gif" Up="" Style="" Title="" 1
"fujibrch.gif" Up="" Style="" Title="" 1
"fujimt.gif" Up="" Style="" Title="" 1
"sumobboo.gif" Up="" Style="" Title="" 1
"sumofeet.gif" Up="" Style="" Title="" 1
"sumohnds.gif" Up="" Style="" Title="" 1
"sumoarm.gif" Up="" Style="" Title="" 1
"cthulhu.gif" Up="" Style="" Title="" 1
"iceman.gif" Up="" Style="" Title="" 1
"sumochr2.gif" Up="" Style="" Title="" 1
Ghosts:
Refs:
"top.htm"
    0 "install.htm"
    0 "startup.htm"
    0 "security.htm"
    0 "costs.htm"
    0 "search.htm"
    0 "under.htm"
    0 "entup.htm"
    0 "smartlnk.htm"
    0 "describe.htm"
    0 "custom.htm"
    0 "archive.htm"
    0 "logging.htm"
    0 "ops.htm"
    0 maktable.ht:
    0 "tables.htm"
    2 "sumobanr.gif"
    0 "srchpage.htm"
    0 "http://www.yahoo.Com/Computers/World_Wide_Web/Databases_and_Searching/"
"install.htm"
    0 "startup.htm"
    2 "sumoguyl.gif"
"startup.htm"
    4 "costs.htm"
    4 "archive.htm"
    4 "logging.htm"
    2 "sumoguy2.gif"
"security.htm"
    0 "/NS/GetSearcForm/ns_users"

-continued

```
    0 "/NS/GetSearchForm/ns_groups"
    0 "/NS/GetSearchForm/ns_groups2user5"
    0 "/NS/GetSearchForm/ns_permission"
    0 "/NS/GetSearchForm/ns_methods"
    2 "sumoguy3.gif"
"costs.htm"
    0 "security.htm"
    4 "startup.htm"
    2 "suxnoguy8.gif"
    0 "/NS/GetSearchForm/ns_costs"
    0 "/NS/GetSearchForm/ns_charges"
    0 /NS/GetSearchForm/ns_total_charges
"search.htm"
    1 "/NS/GetSearchFormPicker
    1 "srchdata.htm"
    1 "srchpage.htm"
    1 "hitlist.htm"
    1 "hilite.htm"
    2 "sumoguy4.gif"
    1 "/NS/GetSearcForm/ns_permissions"
    1 "/NS/GetSearchForm/ns_users"
"srchdata.htm"
    8 "http://www.navisoft.com/STUB"
    2 "sumoguy5.gif"
"srchpage.htm"
    2 "sumoguy6.gif"
    8 "http://www.navisoft.com/STUB"
    0 "/NS/GetSearchForm/ns_default_collection"
"hitlist.htm"
    0 "INS/GetSearchFormlns_default_collection"
    0 "http://www.navisoft.com/STUB"
    0 "http://www.ncaa.uiuc.edu/SDG/Software/XMosaic/help-on-version-2.5b5.htm1'
    0 "http://ww.netscape.com/info/newsrelease16.html"
    0 "http://www.w3.org/hypertext/WWW/Arena/"
    0 "/NS/GetSearcbForm/ns_total_charges"
    2 "sumochar.gif"
"hilite.htm"
    0 "/NS/MoreLikeThis/?Url=%2fservdoc%2ftop.htm"
    0 "/servdoc/top.htm"
    0 "NS/GetLHP/?Url=%2fservdoc%2ftop.htm&terms=cool"
    2 "sumoleaf.gif"
"under.htm"
    2 "cthulhu.gif"
"entup.htm"
    8 "http://www.navisoft.com/STUB"
    2 "sumoguy7.gif"
    0 "/NS/GetEntryForm/ns_permissions"
"smartlnk htm"
    2 "fujibrch.gif"
"describe.htm"
    8 "http://www.navisoft.com/STUB"
    2 fujimt.gif"
"custom.htm"
    2 "sumofeet.gif"
    2. "/NS/GetSearchForm/ns_columns"
"archive.htm"
    4 "startup.htm"
    2 "sumohnds.gif"
    0 "http://navisoft.com:8001/NS/ArchiveVersions/index.html"
    0 "http://navisoft.com:8001/index.html"
    0 "http://navisoft.com:8001/NS/Archive/19950222000000/index.html"
"logging.htm"
    4 "startup.htm"
    2 "sumoarm.gif"
"ops.htm"
    2 "iceman.gif"
    1 "/NS/GetSearchFormPicker"
    1 "/NS/Admin"
    1 "/NS/About"
    1 "/NS/GetNewTableForm"
"maktable.htm"
    0 "/NS/GetDropTableForm"
    0 "/NS/GetCreateTableForm"
    2 "sumobboo.gif"
"tables.htm"
    2 "sumochr2.gif"
"page21.htm"
"sumobanr.gif"
"sumoguy1.gif"
```

-continued

```
"sumoguy2.gif"
"sumoguy3.gif"
"surnoguy4.gif"
"sumoguy5.gif"
"su.moguy6.gif"
"suxnochar.gif"
"sumoleaf.gif"
"sumoguy7.gif"
"sumoguy8 gif"
"fujibrch.gif"
"fujimt.gif"
"sumobboo.gif"
"sumofeet.gif"
"sumohnds.gif"
"stumoarm.gif"
"cthulhu.gif"
"iceman.gif"
"sumochr2.gif"
```

Figure 7:
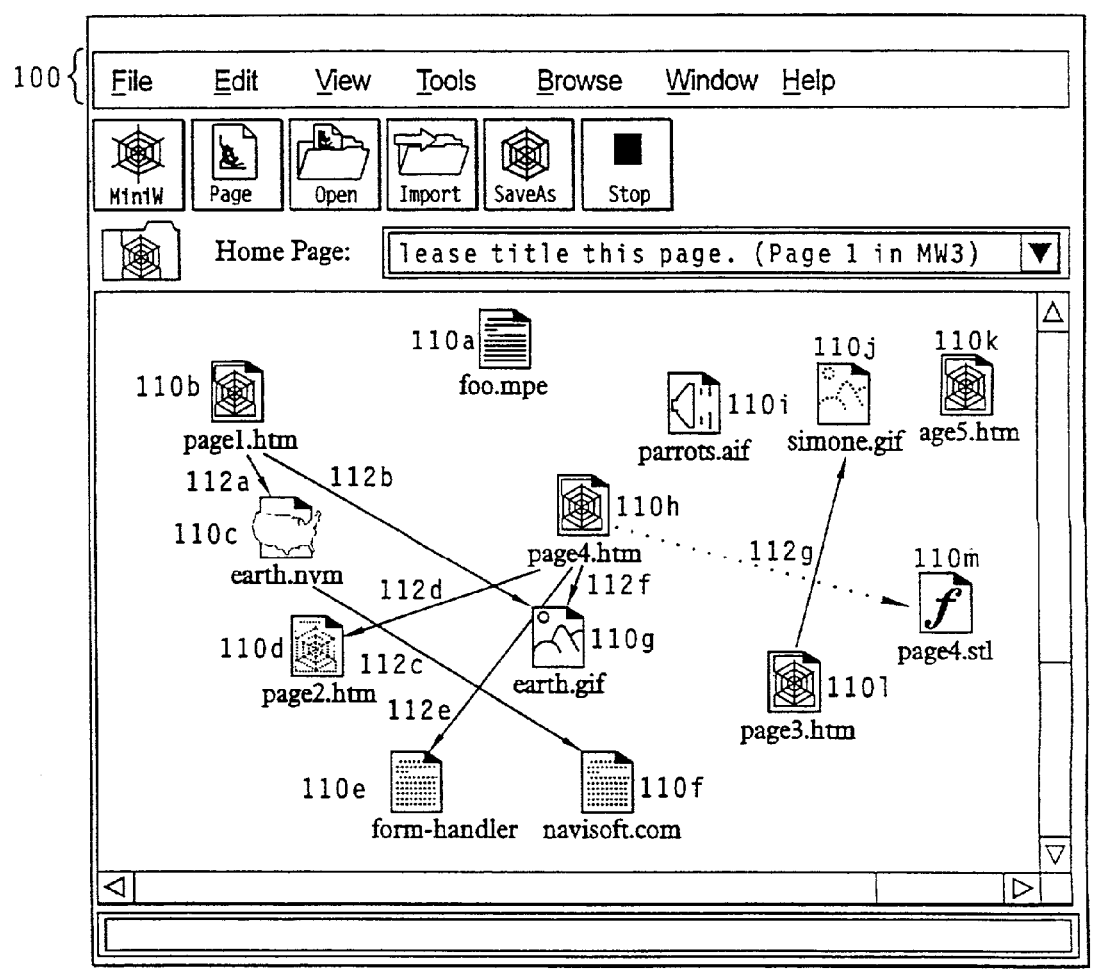
FIG. 7 illustrates a preferred graphical interface for organizing and working with a collection of interrelated hypermedia documents.

A preferred embodiment of the MiniWeb facility that has been described includes an advantageous, graphical front-end for viewing and navigating within a collection of hypermedia documents. FIG. 7 illustrates an example of such a miniweb interface. Display icons 110$a$–$n$ each represent corresponding documents located anywhere on the WAN, or anywhere within the user's local storage. Arrow icons 112$a$–$n$ indicate hypermedia links between documents, in the direction indicated by the arrows. Thus, the miniweb display provides an intuitive, graphical view of the relationship among a collection of hypermedia documents.

The graphical interface of FIG. 7 is preferably displayed in a separate window of client computer 20$d$, alongside document editing windows in accordance with FIG. 4. Users can preferably use the miniweb window as a short-cut to access desired documents within a collection by simply "double-clicking" on the corresponding icon in the miniweb, or by "dragging and dropping" an icon from the miniweb onto a document editing window. Moreover, the precise appearance of icons and connecting arrows preferably indicates the nature or state of the corresponding document or link. For example, icon 110$i$ represents a sound file, while icon 110$b$ is a hypermedia "web" document, as suggested by the appearance of those two icons. Further, the color and shading of icons and arrows may indicate such states as a modified and unsaved document, or a relative or absolute address link. For more details regarding the graphical interface of FIG. 7 and its preferred uses, the reader is referred to the draft User Manual in the Appendix, and particularly chapters 4 Appendix B thereto. Once again, source code included in the Appendix provides exemplary means for implementing the miniweb facility we have described.

Automated Authoring of WAN Hypermedia: "NaviLinks"

Most content on the World Wide Web is not originally created as hypermedia. For example, news articles, product brochures, and other literature originally created for non-interactive environments do not initially contain any hypermedia links to other documents. Such links must be creatively defined and implemented. A preferred feature of the present invention provides assistance in the authoring of hypermedia WAN documents, by facilitating and partially automating the creation of useful hypermedia links. This facility, which we call "NaviLinks" herein, uses statistical language processing algorithms to generate automatically a list of suggested, possible hypermedia links between a source document and a collection of potential target documents. A human author can then review the suggestions in a convenient manner, and choose to incorporate, modify, or discard them.

Figure 8A:
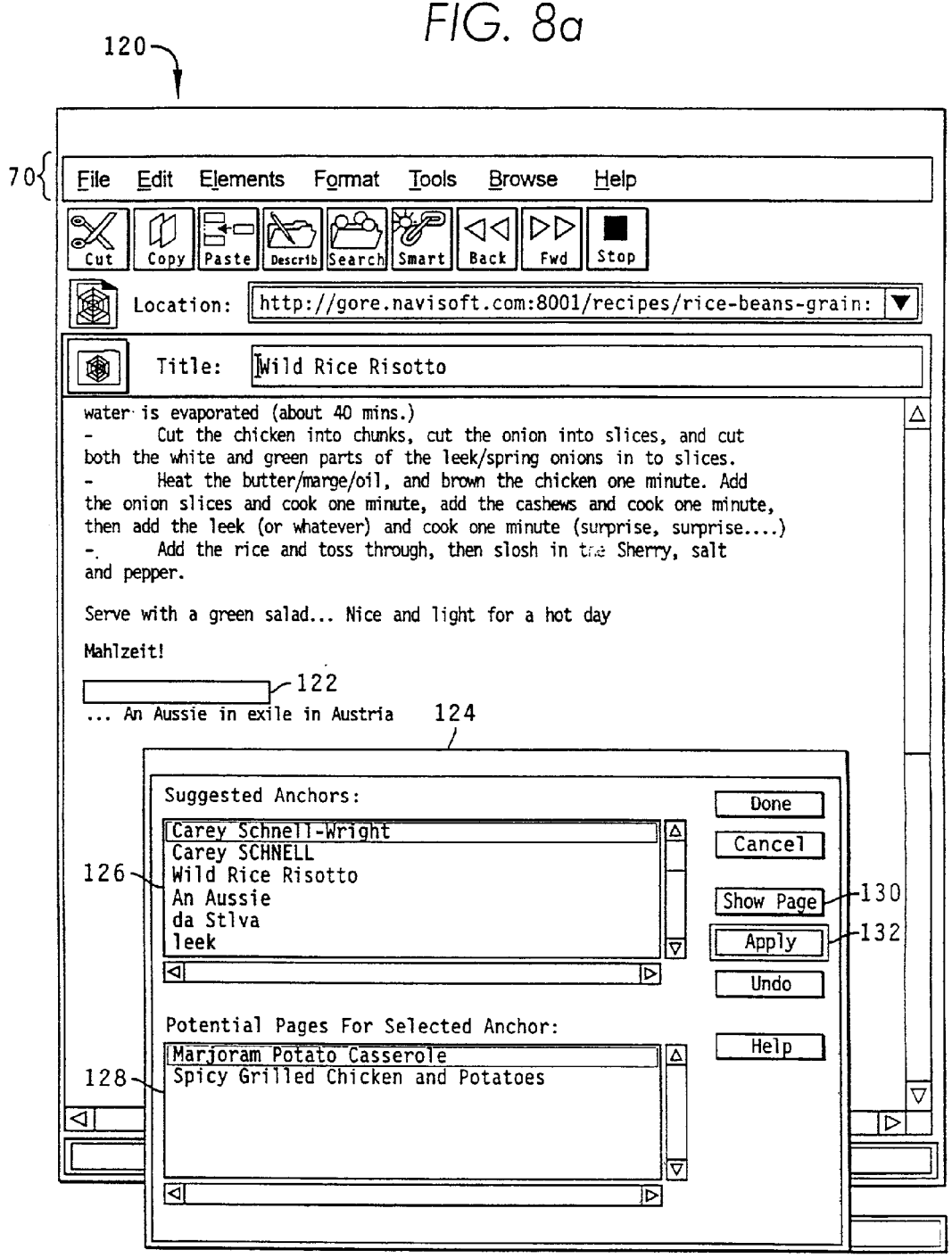
FIG. 8a is a screen image illustrating use of the preferred "NaviLinks" facility to generate suggested hypermedia links.
Figure 8B:
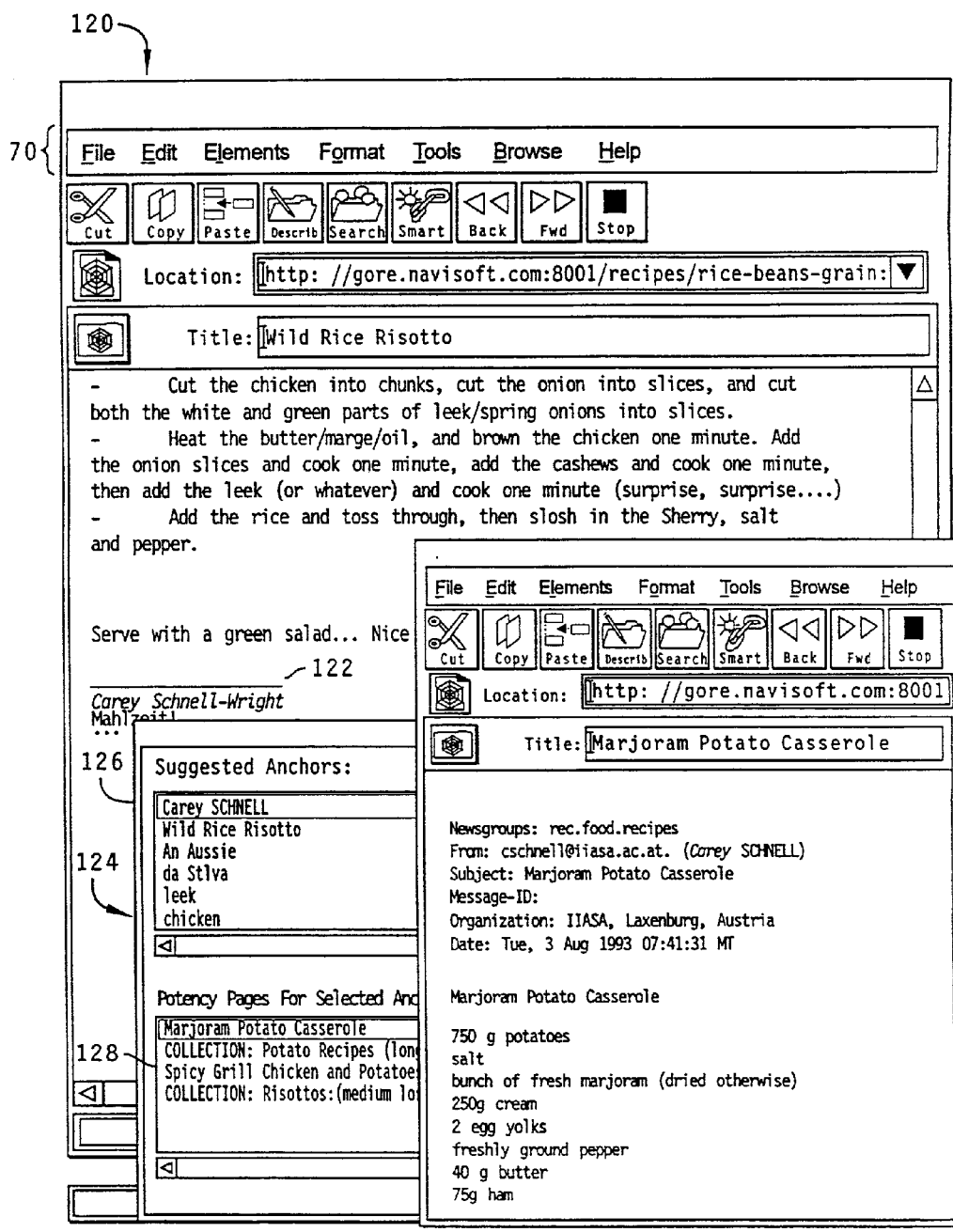
FIG. 8b is a screen image further illustrating use of the preferred "NaviLinks" facility to generate suggested hypermedia links.

The NaviLinks facility is preferably integrated along with the publishing tools described above, and as illustrated in the "screen shots" of FIGS. 8$a$ and 8$b$. Both figures depict document editing window 120, including menu bar 70 in accordance with the teachings of FIG. 4 and the earlier discussion herein. A document entitled "Wild Rice Risotto" (evidently a recipe) is currently open within window 120. In the example shown, the user has already invoked the NaviLinks facility for assistance in creating hypermedia links from the recipe document to related documents. NaviLinks window 124 is thus shown overlapping on document editing window 120. Window 124 displays list 126 of suggested anchor items. An "anchor" item is an item of content within a source document encoded as a hypermedia link; users "click" on anchor items to bring up linked target documents. Thus, the highlighted entry in list 126 corresponds to item 122 in the recipe document, namely, the recipe author's name (Carey Schnell-Wright). NaviLinks window 124 also displays list 128 of potential target documents for the currently highlighted anchor item. The lists of suggested anchor items and potential targets are generated automatically, preferably using statistical language processing techniques such as provided in the Xerox Lexical Technology ("XLT") package commercially available from the Xerox Corporation.

Because of the integrated nature of the tools described herein in accordance with the present invention, the process of exploring and selecting among the suggested anchor items and corresponding hypermedia links shown in FIG. 8$a$ can be performed very conveniently. For each anchor item in list 126, a suggested link in list 128 can be encoded directly onto the anchor item in the source document by pressing "Apply" button 132; or, the target document addressed by the suggested link can itself be accessed and edited in yet another editing window, by pressing "Show Page" button 130. FIG. 8$b$ illustrates the results of pressing these buttons. The visual appearance of anchor item 122 is updated to indicate that it is now encoded as an URL (i.e., a hypermedia link), as a result of the user "applying" a suggested link. In addition, as a result of the user selecting a "Show Page" request, document editing window 134 has been created overlapping on windows 120 and 124, and displays an open WAN document containing another recipe by the same author and entitled "Marjoram Potato Casserole."

WAN-Integrated, Form-Driven, Interactive Services

A hypermedia publishing platform should preferably support not only the authoring and distribution content, but also a variety of form-driven interactive services, such as content-based indexing of documents, and controlled access to proprietary WAN documents. Preferably, application developers and end-users should be able to generate and store new forms, retrieve existing forms, fill out forms, and submit them for appropriate processing, all in a convenient and seamless manner utilizing an integrated editing and browsing environment such as described earlier in connection with FIGS. 4–7.

A great many, desirable, interactive WAN services are database-oriented. For example, a service might involve a particular database "view"(i.e., a specified set of indices) for indexing WAN documents, for managing historical versions of WAN documents, for collecting and reviewing customer feedback, or for relating specified access controls (such as security restrictions and access costs, perhaps of a hierarchical nature) to specific, proprietary WAN documents. Therefore, the form-driven interface environment of the present invention is preferably integrated not only with editing and browsing tools as previously described, but also with a database management system such as the Illustra object relational database management system.

Figure 9:
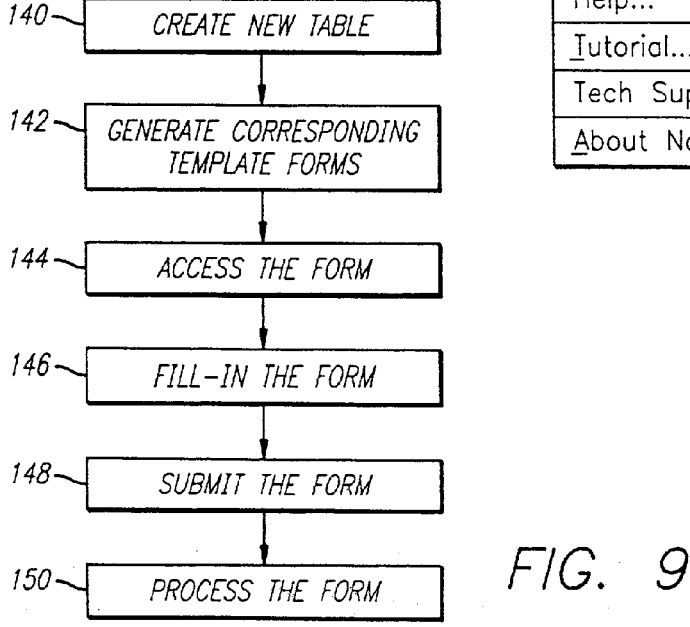
FIG. 9 illustrates a flow diagram for developing and running WAN-based, form-driven, interactive application programs in accordance with the present invention.

FIG. 9 illustrates a sample process flow diagram for developing and utilizing form-driven, interactive, database services in accordance with the present invention. At step 140, a developer user begins the process of setting up a new interactive service by using client computer 20d to create a new database table for the service, preferably using an integrated authoring environment such as window 160 in FIG. 10a. As shown, window 160 includes menu bar 70, and the seamless browsing and editing facilities described earlier herein. The table created in step 140 will include a plurality of data fields 162a–n. As illustrated in FIG. 10a, each one of data fields 162a–n preferably may be associated with various specifications such as a required data type, and whether or not database entries in the table will be indexed (and hence searchable) using that field. As indicated by comment 164 in FIG. 10a, step 140 is completed by pressing a "create table" button or the like. The "create table" button is actually just a special kind of hypermedia link which transmits a requested operation for processing by a target WAN server on which server software 50 is available, as will be described in greater detail further below. In this case, clicking on a "create table" button sends a network message formally registering the new database table with server 10d or another selected WAN server (hereinafter, the "application server") on which server software 50 including a database management system is available.

Figure 10B:
FIG. 10b illustrates a default template form for adding a particular customer's feedback to an indexed database, in accordance with the present invention.

Once a database table is created, at step 142 template forms are generated for interactively updating and searching the database described by the new table. Updating, such as by adding a new database entry, may interactively be performed using a form as illustrated in FIG. 10b, in which informational fields 166a–n correspond to the data fields 162a–n specified in the database table. Thus, a user who accesses the entry form at step 144 can then describe the database attribute values for a new entry at step 146 simply by filling in informational fields 166a–n. Analogous comments apply with regard to forms for submitting a specific database search or query, such as the form of FIG. 10d which includes corresponding information fields 174a–n.

Figure 10C:
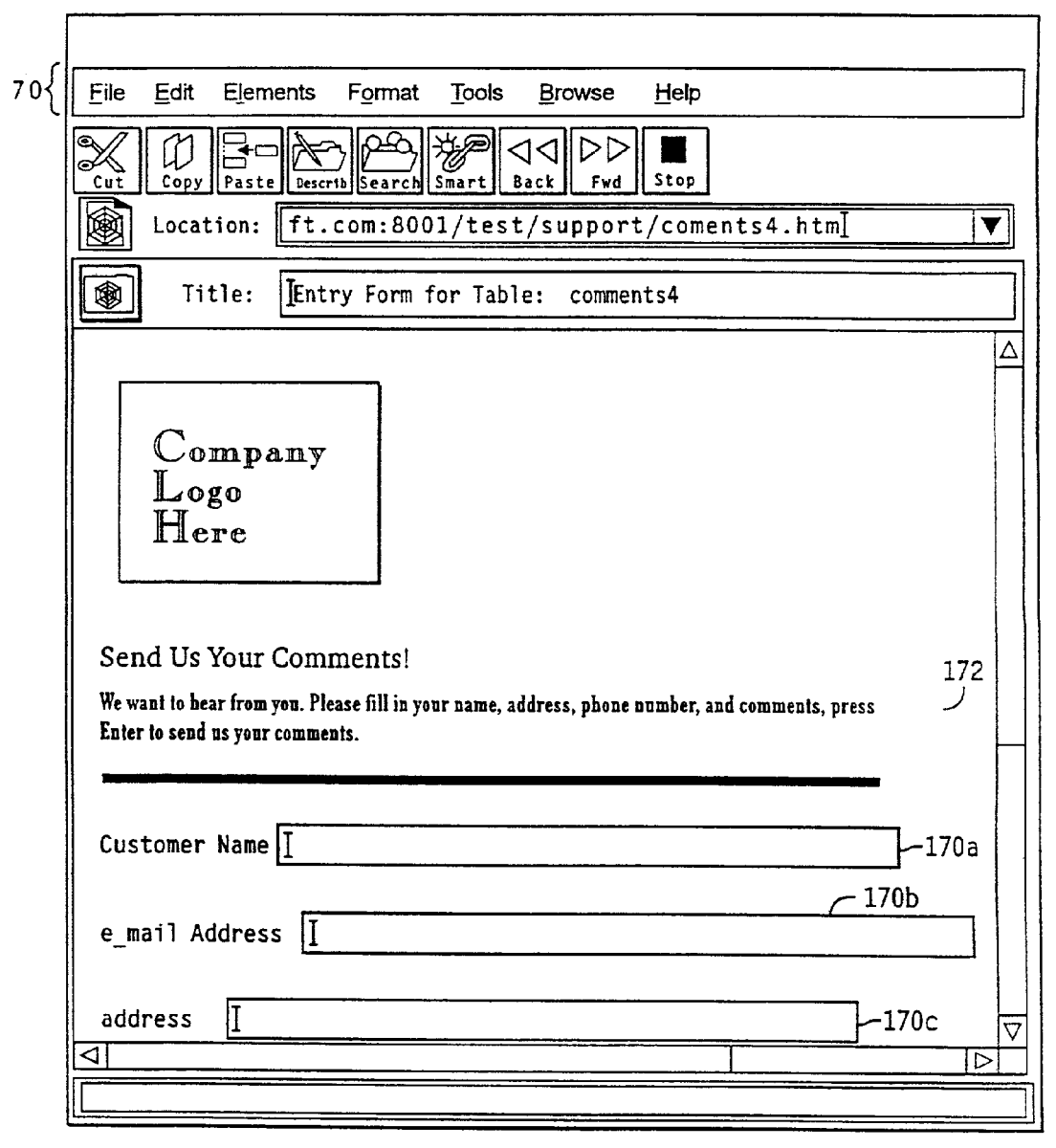
Figure 10D:
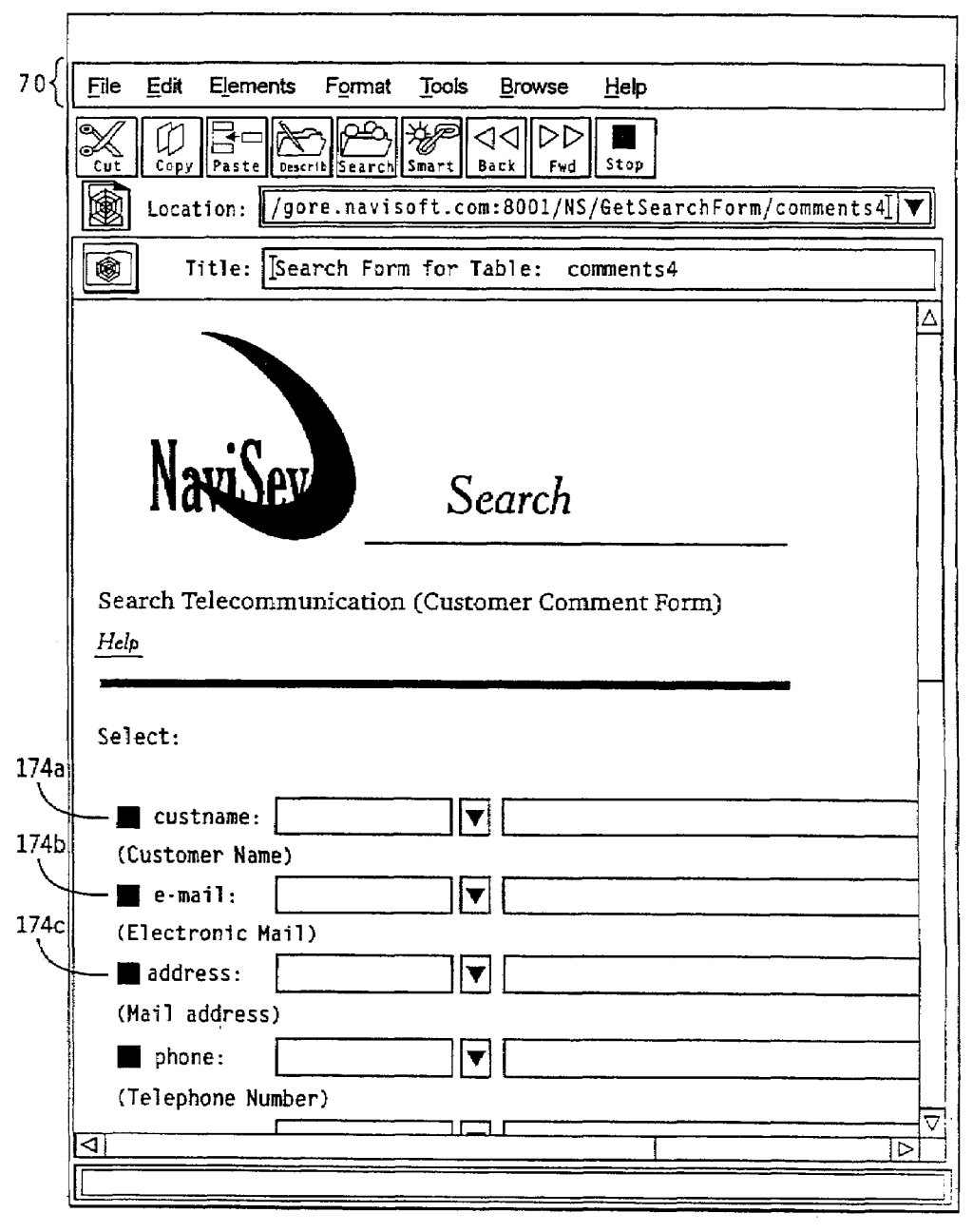

Because description and search forms are integrated with the authoring environment previously described, as indicated by the presence of menu bar 70 in FIG. 10b, 10c, and 10d, users can seamlessly take full advantage of the editing capabilities of that environment in the course of filling out description or search forms. For example, while a WAN document is being accessed and edited by the user in one display window, the user can fill out a corresponding description form or access control form in another window, concurrently. Moreover, users can even modify and customize the style and appearance of entry or search forms, by using the editing facilities of menu bar 70, such as the html mark-up commands of the Elements and Format menus (as discussed previously in connection with FIG. 4). For example, FIG. 10c depicts an edited version of FIG. 10b that still corresponds to the database table of FIG. 10a. Thus, fields 170a–n of FIG. 10c map directly onto fields 166a–n of FIG. 10b, but are merely displayed in a somewhat different appearance.

Thus, the steps of generating and filling in new tables, entry forms, and search forms are seamlessly integrated with the editing and browsing environment previously described. Moreover, even the step of submitting a completed form to the application server for processing may likewise be performed in seamless fashion together with the preceding steps. Thus, at step 148, a user who has completed a database entry or search form submits the form to the application server by pressing a hypermedia "enter" button or the like using a cursor control device as indicated by comments 168 (on FIG. 10a) and 172 (on FIG. 10b), akin to the "create table" button described above in connection with FIG. 10a. Entry and search forms are thus "live," meaning that completing a form and interactively signalling a hypermedia link included in the form will automatically send an appropriate message to the application server, causing server software 50 to initiate appropriate database actions at step 150. The user need not invoke a separate interface, copy any files, or compose any database scripts. Thus, to enjoy interactive database services, users can simply fill out forms using the same environment they use to access and edit documents.

Note that a WAN document referenced in a database may preferably be located anywhere in the WAN in accordance with the present invention, and need not be local to the application server. From the standpoint of server software 50 the database tables reference and index WAN-compatible URL's, (i.e., WAN address pointers), and so need not store documents locally. Note also that, multiple tables and hence multiple indexing views and forms covering the same documents are possible. For example, an administrator might systematically index all documents on a server, while individual users might create their own indexing schemes for documents and criteria of special interest.

For more details regarding various menu-driven interactive services provided by a preferred embodiment of the present invention, the reader is referred to the Appendix, and especially to chapter 5 of the draft User Manual and chapter 3.3 of the White Paper. Details regarding a preferred architecture and implementation for server software 50 in support of menu-driven interactive database services will now be described.

Preferred embodiments of client software 60 ("NaviPress") and server software 50 ("NaviServer") communicate through a WAN hypermedia protocol such as http. All requests and responses between client and server are accomplished through http. Thus, NaviPress sends requests to NaviServer using GET, PUT, POST, BROWSE, and DELETE methods, and NaviServer returns results using standard http return codes, as well as some special content types in accordance with the present invention. Both NaviPress and NaviServer are thus "open" in the sense that any http-compliant client computer can access most services provided by NaviServer, and NaviPress can be used with any http-compliant WAN server.

NaviPress requests for services from NaviServer may contain ordinary URL's, but sometimes contain special URL's that map to server functions. If a request is not immediately serviceable—e.g., GET a page for browsing—NaviServer checks to see if the URL contains a special data field encoding a registered operation that maps to server-specific processing code. For example, NaviServer preferably includes about twenty pre-installed operations, listed in Table 1, for implementing common server functions such as publishing, administration, information retrieval, and document management functions. These special URL's take the general form of "/prefix/operation/arguments," where the "arguments" are an arbitrarily long string that is passed to the "operation." The NaviServer looks for registered prefixes and recognized operations, and then passes the request to the appropriate utility program or process. NaviServer is designed so that custom services can be added easily. Application developers can register new operations with their own unique prefixes. Since a standard, open protocol is used for communications between client and server, even vendors of other authoring tools can write interfaces that advantageously publish content to a server running NaviServer software.

TABLE 1

Examples of NaviServer operations

| | |
|---|---|
| GetSearchFormPicker | Get list of links to a variety of search forms installed on the server. Examples include problem report forms, customer comments, permissions. |
| GetSearchForm | Get a specific search form for specifying search criteria. |
| SearchQueryByForm | Search via query by form. |
| GetLocalHilitedPage | Get a local highlighted page, where highlights identify the terms in the page that met the selection criteria |
| GetRemoteHilitedPage | get a remote highlighted page, where highlights identify the terms in the page that met the selection criteria |
| MoreLikeThis | search via "more like this" (find similar documents by using terms in the target page) |
| NaviLink | generate anchor terms and phrases |
| GetEntryForm | get form for database entry |
| GetUpdateForm | get form for database update |
| GetUpdateOrEntryForm | get update (existing data) or entry (new data) form as appropriate |
| GetMeta Tables | get list of entry tables |
| Admin | administrative controls and views for access (permissions and costs), tables (view, add, drop), users and groups (view, add, assign), and usage (raw or by user) |
| About | gets information about server (name, version, host, port, database, archiving charging) |
| ArchiveVersions | archive a version of a page or document |
| GetNewTableForm | get a new table form, for creating a new table |
| CreateTable | create a table |

For more details on this subject, the reader is referred to the Appendix hereto, especially the White Paper at chapter 4, and sample source code for the server software and related code.

OTHER VARIATIONS

The fully integrated client-server environment illustrated herein represents a very powerful and flexible platform for authoring hypermedia content. Detailed illustrations have been provided for the edification of those of ordinary skill in the art, and not as any kind of limitation on the scope of the invention. Numerous variations and modifications within the spirit of the present invention will of course occur to those of ordinary skill in the art in view of the preferred embodiments that have now been disclosed. Such variations, as well as any other systems embodying any of the following claims, all remain within the scope of the present invention:

What is claimed is:

1. A method for editing electronic documents located remote from but accessible to a client computer, the method comprising:

accessing a browser from a client computer;

using the browser to navigate to a document located within a wide area network and remote from but accessible to the client computer;

using the browser to access an interface enabling entry of edits to content of the document;

editing the content of the document with a mark-up language recognized by the wide area network and that enables universal access to the edited content, and with the interface accessed using the browser; and saving the document, as edited, to a location remote from but universally accessible through the wide area network to another client computer.

2. The method as in claim 1 wherein:

using the browser to navigate to the document includes using the browser to navigate to the document located on a server on the wide area network; and saving the document includes saving the document, as edited, to the server.

3. The method as in claim 1 further comprising publishing the document, as edited, from the location remote from but accessible to the client computer.

4. The method as in claim 3 wherein publishing the document includes publishing the document, as edited, from the location such that the document, as edited, is immediately accessible from the location remote from but accessible to the client computer.

5. The method as in claim 1 wherein editing the document includes using the interface to drag and drop content from another document into the document being edited.

6. The method as in claim 5 wherein the dragged and dropped content includes one or more hypermedia links.

7. The method as in claim 1 wherein editing the document includes using the interface to copy and paste content from another document into the document being edited.

8. The method as in claim 7 wherein the copied and pasted content includes one or more hypermedia links.

9. The method as in claim 1 wherein editing the document includes using the interface to cut and paste content from another document into the document being edited.

10. The method as in claim 9 wherein the cut and pasted content includes one or more hypermedia links.

11. The method as in claim 1 wherein using the browser to navigate to the document includes using the browser to open the document located remote from but accessible to the client computer.

12. The method as in claim 1 wherein:
using the browser to navigate to the document includes using the browser to navigate to a first document containing a hypermedia link located remote from but accessible to the client computer and using the browser to select the hypermedia link to access a second document;
editing the document includes editing the second document with the interface accessed using the browser; and
saving the document includes saving the second document, as edited, to the location remote from but accessible to the client computer.

13. The method as in claim 1 wherein using the browser to navigate to the document and editing the document with the interface enable a user of the client computer to seamlessly browse and edit documents located remote from but accessible to the client computer.

14. The method of claim 1 wherein editing the content of the document with the interface comprises inserting markup-codes into the document.

15. The method of claim 1 wherein universally accessible through the wide area network comprises universal access by all users of a particular type of source browser.

16. A computer program residing on a computer-readable medium, for editing electronic documents located remote from but accessible to a client computer, the computer program comprising instructions for causing a computer to:
access a browser from a client computer;
use the browser to navigate to a document within a wide area network and located remote from but accessible to the client computer;
use the browser to access an interface enabling entry of edits to content of the document;
edit the content of the document with a mark-up language recognized within the wide area network and that enables universal access to the edited content, and with the interface accessed using the browser; and
save the document, as edited, to a location remote from but universally accessible through the wide area network to another client computer.

17. The computer program of claim 16 wherein:
the instructions for causing the computer to use the browser to navigate to the document include instructions for causing the computer to use the browser to navigate to the document located on a server on a the wide area network; and
the instructions for causing the computer to save the document include instructions for causing the computer to save the document, as edited, to the server.

18. The computer program of claim 16 further comprising instructions that cause the computer to publish the document, as edited, from the location remote from but accessible to the client computer.

19. The computer program of claim 18 wherein the instructions for causing the computer to publish the document include instructions for causing the computer to publish the document, as edited, from the location such that the document, as edited, is immediately accessible from the location remote from but accessible to the client computer.

20. The computer program of claim 16 wherein the instructions for causing the computer to edit the document include instructions for causing the computer to use the interface to drag and drop content from another document into the document being edited.

21. The computer program of claim 20 wherein the dragged and dropped content includes one or more hypermedia links.

22. The computer program of claim 16 wherein the instructions for causing the computer to edit the document include instructions for causing the computer to use the interface to copy and paste content from another document into the document being edited.

23. The computer program of claim 22 wherein the copied and pasted content includes one or more hypermedia links.

24. The computer program of claim 16 wherein the instructions for causing the computer to edit the document include instructions for causing the computer to use the interface to cut and paste content from another document into the document being edited.

25. The computer program of claim 24 wherein the cut and pasted content includes one or more hypermedia links.

26. The computer program of claim 16 wherein the instructions for causing the computer to use the browser to navigate to the document include instructions for causing the computer to use the browser to open the document located remote from but accessible to the client computer.

27. The computer program of claim 16 wherein:
the instructions for causing the computer to use the browser to navigate to the document include instructions for causing the computer to use the browser to navigate to a first document containing a hypermedia link located remote from but accessible to the client computer and to use the browser to select the hypermedia link to access a second document;
the instructions for causing the computer to edit the document include instructions for causing the computer to edit the second document with the interface accessed using the browser; and
the instructions for causing the computer to save the document include instructions for causing the computer to save the second document, as edited, to the location remote from but accessible to the client computer.

28. The computer program of claim 16 wherein the instructions for causing the computer to use the browser to navigate to the document and edit the document with the interface enable a user of the client computer to seamlessly browse and edit documents located remote from but accessible to the client computer.

29. The computer program of claim 16, wherein to edit the content of the document with the interface comprises inserting markup-codes into the document.

30. The computer program of claim 16, wherein universally accessible through the wide area network comprises universal access by all users of a particular type of source browser.

31. A system for editing electronic documents located remote from but accessible to a client computer, comprising:
- means for accessing a browser from a client computer;
- means for using the browser to navigate to a document located within a wide area network and remote from but accessible to the client computer;
- means for using the browser to access an interface enabling entry of edits to content of the document;
- means for editing the content of the document with a mark-up language recognized within the wide area network and that enables universal access to the edited content, and with the interface accessed using the browser; and
- means for saving the document, as edited, to a location remote from but universally accessible through the wide area network to another client computer.

32. The system of claim 31 wherein:
- the means for using the browser to navigate to the document includes means for using the browser to navigate to the document located on a server on the wide area network; and
- the means for saving the document includes means for saving the document, as edited, to the server.

33. The system of claim 31 further comprising means for publishing the document, as edited, from the location remote from but accessible to the client computer.

34. The system of claim 33 wherein the means for publishing the document includes means for publishing the document, as edited, from the location such that the document, as edited, is immediately accessible from the location remote from but accessible to the client computer.

35. The system of claim 31 wherein:
- the means for using the browser to navigate to the document includes means for using the browser to navigate to a first document containing a hypermedia link located remote from but accessible to the client computer and means for using the browser to select the hypermedia link to access a second document;
- the means for editing the document includes means for editing the second document with the interface accessed using the browser; and
- the means for saving the document includes means for saving the second document, as edited, to the location remote from but accessible to the client computer.

36. The system of claim 31, wherein to edit the content of the document with the interface comprises inserting markup-codes into the document.

37. The system of claim 31, wherein universally accessible through the wide area network comprises universal access by all users of a particular type of source browser.

38. A method for editing electronic documents located remote from but accessible to a client computer, the method comprising:
- accessing a browser from a client computer;
- using the browser to navigate to a document located within a wide area network and remote from but accessible to the client computer;
- using the browser to access an interface enabling entry of edits to content of the document;
- editing the content of the document with the interface accessed using the browser; and
- saving the document, as edited, to a location remote from but universally accessible through the wide area network to another client computer, wherein universally accessible through the wide area network comprises universal access by all users of a particular type of source browser.

39. A computer program residing on a computer-readable medium, for editing electronic documents located remote from but accessible to a client computer, the computer program comprising instructions for causing a computer to:
- access a browser from a client computer;
- use the browser to navigate to a document within a wide area network and located remote from but accessible to the client computer;
- use the browser to access an interface enabling entry of edits to content of the document;
- edit content of the document with the interface accessed using the browser; and
- save the document, as edited, to a location remote from but universally accessible through the wide area network to another client computer, wherein universally accessible through the wide area network comprises universal access by all users of a particular type of source browser.

40. A system for editing electronic documents located remote from but accessible to a client computer, comprising:
- means for accessing a browser from a client computer;
- means for using the browser to navigate to a document located within a wide area network and remote from but accessible to the client computer;
- means for using the browser to access an interface enabling entry of edits to content of the document;
- means for editing content of the document with the interface accessed using the browser; and
- means for saving the document, as edited, to a location remote from but universally accessible through the wide area network to another to the client computer, wherein universally accessible through the wide area network comprises universal access by all users of a particular type of source browser.

* * * * *